(12) United States Patent
Crowley (10) Patent No.: US 7,297,384 B2
(45) Date of Patent: Nov. 20, 2007

(54) METALLIZED HEAT RESISTANT MATERIAL WITH THERMAL BARRIER

(76) Inventor: Shawn Kelly Crowley, 37358 Murray Rd., Pearl River, LA (US) 70452

( * ) Notice: Subject to any disclaimer, the term of this patent is extended or adjusted under 35 U.S.C. 154(b) by 163 days.

(21) Appl. No.: 11/297,111

(22) Filed: Dec. 7, 2005

(65) Prior Publication Data

US 2006/0147696 A1 Jul. 6, 2006

Related U.S. Application Data

(60) Provisional application No. 60/633,803, filed on Dec. 7, 2004.

(51) Int. Cl.
*B65D 85/00* (2006.01)
(52) U.S. Cl. ............... 428/35.2; 428/319.1; 428/319.3; 428/319.7; 428/317.1; 428/317.7; 383/109; 383/110; 383/113
(58) Field of Classification Search ............. 428/319.1, 428/319.3, 319.7, 317.1, 317.7, 35.2; 383/109, 383/110, 113
See application file for complete search history.

(56) References Cited

U.S. PATENT DOCUMENTS

| 4,247,428 A | 1/1981 | Kulkarni |
| 4,271,218 A | 6/1981 | Heckel et al. |
| 4,384,083 A | 5/1983 | Baker |
| 4,401,104 A | 8/1983 | Kuzdrall |
| 4,508,776 A | 4/1985 | Smith |
| 4,529,633 A | 7/1985 | Karlsson |
| 4,537,313 A | 8/1985 | Workman |
| 4,657,807 A | 4/1987 | Fuerstman |
| 4,668,555 A | 5/1987 | Uekado et al. |
| 4,686,152 A | 8/1987 | Matsubayashi et al. |
| 4,813,210 A | 3/1989 | Masuda et al. |
| 4,871,597 A | 10/1989 | Hobson |
| 4,916,016 A | 4/1990 | Bristowe et al. |
| 4,924,650 A | 5/1990 | Dalluge |
| 4,985,106 A | 1/1991 | Nelson |

(Continued)

FOREIGN PATENT DOCUMENTS

| JP | 06-134928 | 5/1994 |
| JP | 08-090689 | 9/1996 |

OTHER PUBLICATIONS

Tony Whelan, Polymer Technology Dictionary, p. 191. 1994.

(Continued)

*Primary Examiner*—Hai Vo
(74) *Attorney, Agent, or Firm*—Garvey, Smith, Nehrbass & North, L.L.C.; Charles C. Garvey, Jr.; Seth M. Nehrbass (57) ABSTRACT

A laminated metallized film apparatus being fabricated through the use of roll-to-roll lamination machinery (e.g. using a gravure cylinder) which through the use of various combinations of adhesive, pressure, and temperature bonds various materials and substrates together, producing a thermal radiative and insulative barrier to impinging multiple heat sources in the range of ultra-violet longwave-infrared wavelengths. In applications the laminated metallized film apparatus may be constructed so as to create an insulating bag, pouch, tote, insulative wrap, or radiant reflector sheeting, through use of single or multiple layer films or foams of varying thickness and texture.

12 Claims, 6 Drawing Sheets

U.S. PATENT DOCUMENTS

| | | |
|---|---|---|
| 5,008,366 A | 4/1991 | Bathe |
| 5,105,970 A | 4/1992 | Malone et al. |
| 5,108,821 A | 4/1992 | Dooley et al. |
| 5,143,245 A | 9/1992 | Malone |
| 5,231,814 A | 8/1993 | Hageman |
| 5,324,467 A | 6/1994 | Anderson, II |
| 5,451,367 A | 9/1995 | Stark et al. |
| 5,585,154 A | 12/1996 | Rhoades |
| 5,895,723 A | 4/1999 | Utz |
| 6,037,032 A * | 3/2000 | Klett et al. .................. 428/71 |
| 2006/0147696 A1 | 7/2006 | Crowley |

OTHER PUBLICATIONS

Peter Shmitz, et al., "Films" Ullman's Encyclopedia of Industrial Chemistry, 5th Ed., vol. A11, pp. 85-86, 92-93, 95-110. 1988.
5 pages from www.keepcoolUSA.com.
29 pages from www.thermasnap.com.

* cited by examiner

METALLIZED HEAT RESISTANT MATERIAL WITH THERMAL BARRIER

CROSS-REFERENCE TO RELATED APPLICATIONS

U.S. Provisional Patent Application Ser. No. 60/633,803, filed Dec. 7, 2004, priority of which is hereby claimed, is incorporated by reference.

U.S. Provisional Patent Application Ser. No. 60/023,056, filed Aug. 2, 1996, and U.S. Provisional Patent Application Ser. No. 60/009,737, filed Jan. 11, 1996, is hereby claimed. Those applications are hereby incorporated by reference.

U.S. patent application Ser. No. 10/245,829, filed 17 Sep. 2002, is incorporated herein by reference, as are U.S. patent application Ser. No. 08/781,285 and its corresponding PCT application no. PCT/US97/00473 (published as WO 97/25196 on 17 Jul. 1997), both filed 10 Jan. 1997. However, this is not a continuation or continuation-in-part of any of these patent applications.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention relates to an improved flexible laminate that includes multiple film layers and which is used in shipping, storage, and preservation of foodstuffs, medical supplies or like items that may be heat sensitive. The present invention also relates to flexible laminates which are used in sheet or rolled form to provide thermal, aqueous vapor, and environmental barriers in buildings or structures such as homes, factories or storage facilities. The present invention is defined as a thermal barrier with respect to the reflection and insulation from impinging thermal radiation from the ultra-violet to the long-wave infrared wavelengths emitted by any thermal source.

2. General Background of the Invention

There is a need in remote seafood processing locations, such as rural Alaska, for improved materials and methods to be used in the short-term holding and transportation of fresh fisheries products. This need stems from: the high costs associated with transporting Styrofoam-based packaging that requires a large storage volume. Also in dealing with the many unanticipated events of the fishing year and the consumer markets for the products, if the demand for Styrofoam-based products has not been accurately forecast, supplies of packaging materials may be low when the volume of fresh seafood products is high. In these circumstances of high processing volume and depleted stores of Styrofoam packaging, gel ice in Wetlock cases (wax-coated corrugated cardboard boxes) is not the preferred substitute, but it is now all that is available.

Prior use of laminates has been in electrostatic, vapor barrier or container forms which solely rely on the imperviousness and strength of the material to retain an object or material with the confines of the form. Unlike prior containers of barrier materials the present invention provides properties through a unique lay-up of materials which provide thermal, vapor and strength qualities which exceed the usual composition and fabrication.

The U.S. Patents mentioned herein are incorporated herein by reference.

A number of patents have issued for various metallized fabrics and layered film constructions that purport to provide heat retention, insulation or like qualities.

Metallized fabric is the subject of U.S. Pat. No. 4,508,776. In the '776 patent, a microporous metallized fabric suitable for use as a thermally insulating material in a hostile environment includes a microporous fabric substrate for example of a spun bonded polyethylene having a layer of aluminum deposited thereon by a vacuum depositing technique. A thin layer—typically of 0.9-1.0 g/m²-of a polyamide based ink is then printed on to the metallizing, by way of a photogravure printing process, in such a way as not to affect the porous structure of the metallized fabric. The metallized fabric of this invention finds a particular application as screening for commercial glass-houses, to reduce the heat losses therefrom.

The Workman patent, U.S. Pat. No. 4,537,313, provides an insulated bag of a multi-layer construction employing nylon fabric as inner and outer liners, thermal suede as a thermal insulation inside the outer liner, needle punched Dacron fabric as a vapor and thermal barrier, aluminum foil as a thermal barrier, and metallized Mylar as a vapor barrier.

Another metallized fabric is the subject of U.S. Pat. No. 4,657,807. In the '807 patent, a bright finish metal-covered fabric having a metal layer deposited on fabric is disclosed. A fabric, selected to be capable of flattening or polishing under heat and pressure, is pressed against a heated surface and is then vacuum metallized. In a preferred embodiment, a thermoplastic fabric is flattened against a hot roll in a calender press under high pressure, and aluminum is then vapor-deposited.

A thermal gain sensor is the subject of U.S. Pat. No. 4,401,104.

A metal foil or plastic film clad reinforced resin substrate is disclosed in U.S. Pat. No. 4,916,016.

An insulation structure for appliances is disclosed in U.S. Pat. No. 4,985,106 issued to Nelson.

A freight container insulating system and method is the subject of U.S. Pat. No. 5,105,970.

U.S. Pat. No. 5,108,821 discloses a self-extinguishing blanket enclosed with plastic films.

A leak-proof insulating system for freight containers is disclosed in U.S. Pat. No. 5,143,245. The portions of the apparatus are in the form of multi-layered side walls. Part of the construction uses cross-linked polyethylene foam.

The Anderson patent, U.S. Pat. No. 5,324,467, discloses a process for preparation of oriented multi-layer laminate film.

The present invention is an improvement over these prior art patented constructions.

BRIEF SUMMARY OF THE INVENTION

The preferred embodiment of the present invention is primarily composed of a reflective material which consists of vapor deposited aluminum on a polyester film, with additional laminate being further applied so that a thin sheet of material is created that can be stored on a standard size roll (for example, 55 inches (1.4 meters) in width and up to 600 feet (183 meters) in length).

Metallized polyester acts as a temperature resistant material. Thermal heat is reflected by the metallized polyester. The polyethylene films and polyethylene foams act as insulation and/or thermal barriers. Contents of packaging made of this material are insulated from the metallized polyester and conduction of heat from the metallized polyester. When the metallized polyester laminated to a polyethylene film is used in housing, it acts as insulation because the metallized polyester reflects heat away from the house. The same material can be used in automobiles, trucks and other vehicles for insulation from different heat sources, e.g. engines and radiant heat from the sun. This material has many applications.

The present invention comprises various light-weight composite embodiments. The first embodiment comprises a lamination of the primary metallized polyester film to low-density polyethylene film using a polyester adhesive. The lamination of the primary and secondary films through a set of gravure cylinders using heat and pressure joins the materials through the thermoplastic polyester adhesive such that a reflective barrier and high-strength skin are formed.

Another embodiment is the lamination of the primary metallized polyester film to relatively thin polyethylene foam which is further laminated to an additional polyethylene film. Each lamination in this embodiment is processed through gravure cylinders using a heat and pressure sensitive polyester adhesive. The layers comprise a finished, rolled sheet of material which may be further processed into heat-resistant bags, totes, pouches, and insulating sheets which have a high radiant barrier quality, high tensile strength and reduced thermal conduction for the item enclosed in the bag.

Yet another embodiment is lamination of the metallized polyester film to an additional polyester film through a gravure cylinder process using heat and pressure with a heat and pressure sensitive polyester adhesive. The use of polyester substrates in total with the highly reflective thermal barrier created provides for higher material ignition temperature as well as high longitudinal and transversal tensile strengths. A variation of this embodiment is a coating of acrylic applied specifically to the side of the finished laminate intended to be placed in an environmentally exposed position which may be subject to ultra-violet radiation such as from the Sun.

Because of the high optical density and the low emissivity of this material, packaging, insulation, or any device derived from this material outperforms in many ways many materials made prior to the material.

The apparatus of the present invention can be made into rolls of material consisting of metallized polyester and part, some and/or all of the thermal barriers. The material from the rolls can be used by itself for insulation for structures or fabricated into canopies, tarps, tents or other structures, freestanding or attached. The material can be used for several kinds of insulation to protect against heat e.g. trucks, cars. The product is fabricated and heat-sealed or sewed into polybags (with or without a zip-lock type closure, and in any size of any currently commercially available polybags, such as zip-lock freezer and sandwich bags, for example), cargo container covers, umbrellas, hats and other forms of packaging and garments. Polybags with handles for such uses as portable coolers and carryouts (hot and cold) for perishables, e.g. fresh fish or hot meals, are other applications for the material.

The present invention thus provides a thermal radiative, insulating barrier film apparatus of improved construction. The apparatus preferably includes a first layer of polyester film having a vapor deposited metallic coating thereon. A second layer of film is layered with the first layer, a layer of thermal plastic polymeric adhesive being placed in between the first and second film layers.

The adhesive is preferably a polyester adhesive. The first layer of polyester film is preferably of a thickness of between 0.00044 and 0.00046 inches (0.112 and 0.117 mm).

The vapor deposited metallic coating preferably has a thickness of between about 0.00001 and 0.00050 inches (0.00254 and 0.127 millimeters).

The vapor deposited coating of aluminum preferably has a maximum transmissivity of about 35 percent.

The vapor deposited coating of aluminum preferably has an optical density of between about 2.8 and 3.2.

The second film layer is preferably a low density polyethylene film layer. The second film layer preferably has a thickness of between about 0.0015 and 0.01 inches (0.381 and 2.54 mm).

In a second embodiment, the improved barrier film apparatus of the present invention provides a thermal radiative, insulating barrier film apparatus. The apparatus includes a first layer of polyester film, a vapor deposited coating of aluminum on the first layer of polyester film, and a second layer of film that is a polyethylene film layer.

A third layer of polyethylene foam sheeting is placed in between the first and second film layers wherein the second and third layers are bonded together.

A layer of thermal plastic polymeric adhesive is placed in between the first and second film layers.

The third layer preferably has a thickness of between about 0.001 and 0.005 inches (0.0254 and 0.127 mm).

The second film layer is preferably a low density polyethylene film layer having a thickness of between 0.0010 and 0.0050 inches (0.254 and 1.27 mm).

In a third embodiment, an improved thermal radiative, insulating film barrier apparatus includes a first layer of polyester film, the polyester film layer having a vapor deposited coating of aluminum thereon. The third embodiment includes a second layer of film that is a polyester film layer. A layer of thermal plastic polymeric adhesive is placed in between the first and second film layers.

A fourth embodiment, similar to the third embodiment, further includes an acrylic layer that provides an outer ultraviolet light protective skin to the assembly of the first and second film layers as an optional layer to protect the film apparatus when used in direct sunlight for example.

The acrylic layer preferably has a thickness of between about 5 and 50 microns, more preferably of between about 10 and 30 microns, and most preferably of between about 22 and 25 microns.

The present invention thus provides a layered material for modifying the physical characteristics of packaging and insulation such that the physical principles in which "heat goes to cold" are evaded. The apparatus includes a first metallized heat resistant layer which has highly reflective properties over a large spectrum of radiation. A second layer is provided which retards the transfer of thermal energy by conduction. A third layer can be provided for bonding the first and second layers of material together.

The apparatus of the present invention provides a layered film apparatus that may be processed to form bags, pouches, totes, or other packaging devices without the loss of mechanical integrity of or material characteristics, even when automatic machinery is used in the construction.

The present invention also comprises a method of shipping frozen and/or refrigerated goods which comprises the following steps:

providing a shipping material as described herein; and placing the goods in a container made of the shipping material; and shipping the goods.

There is preferably provided a layer which is safe for contact with food adjacent which layer the goods are placed. The method further comprises the step of placing a substance which is colder than the goods in the container with the goods, or the step of placing a means for providing a substance in the container which is colder than the goods in the container (such as a carbon dioxide containing cooling means).

The material of the present invention is preferably rather thin (to allow it to be stored and shipped easily and to take up as little room as possible when used as a packaging and/or insulating material). It preferably has a thickness not greater than 1" (2.54 cm), more preferably not greater than ½" (1.27 cm), and most preferably not greater than ¹⁄₁₆" (0.159 cm). Bags made of the present invention will normally be twice as thick as the material, and thus preferably have a thickness not greater than 2" (5.08 cm), more preferably not greater than 1" (2.54 cm), and most preferably not greater than ⅛" (0.318 cm).

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

For the purposes of promoting an understanding of the principles of the invention, reference will now be made to the various embodiments of the invention as illustrated in the drawings. Specific language will be used to describe each drawing of the embodiments. It will be understood that no limitation of the scope of the invention is intended by these references and that such alterations, further modifications, and further applications of the principles of the invention as illustrated maybe contemplated as would normally occur to one skilled in the art to which the invention relates.

DETAILED DESCRIPTION OF THE INVENTION

Figure 1:
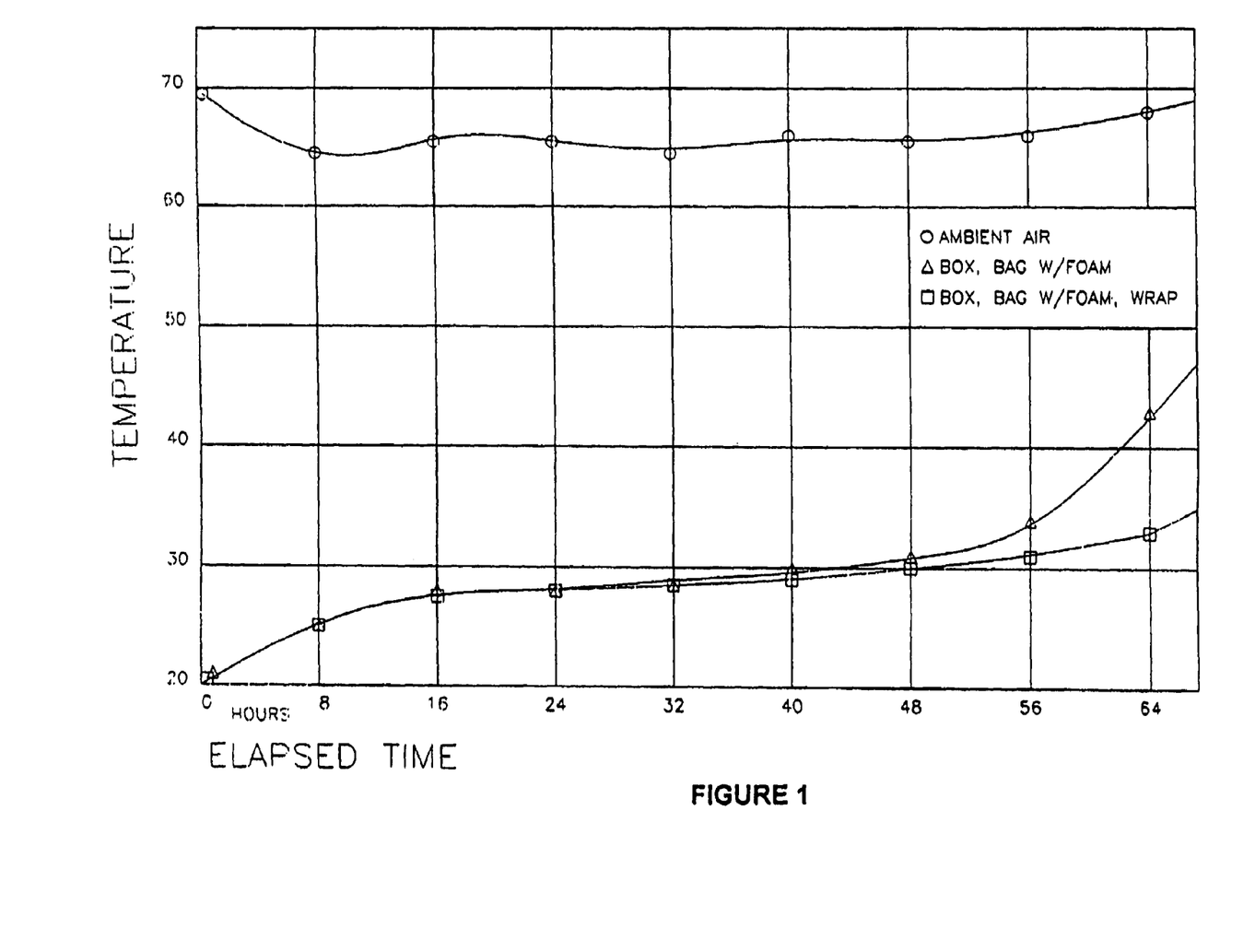
FIG. 1 is a graphical diagram of temperature versus elapsed time for frozen food stuff contained within a sealed bag construction in accordance with the present invention.

The graph of FIG. 1 shows the results of using the metallized heat resistant material of the present invention as a bag which may be sealed, both with and without a plastic bubblewrap layer. The increase in time for which foodstuffs may remain frozen through the use of the metallized heat resistant material of the present invention with bubblewrap is shown by the lower trace versus the metallized heat resistant material of the present invention without bubblewrap in the upper trace. As can be seen, even the bag without the bubblewrap layer kept the product cold for a significant period of time.

Figure 2:
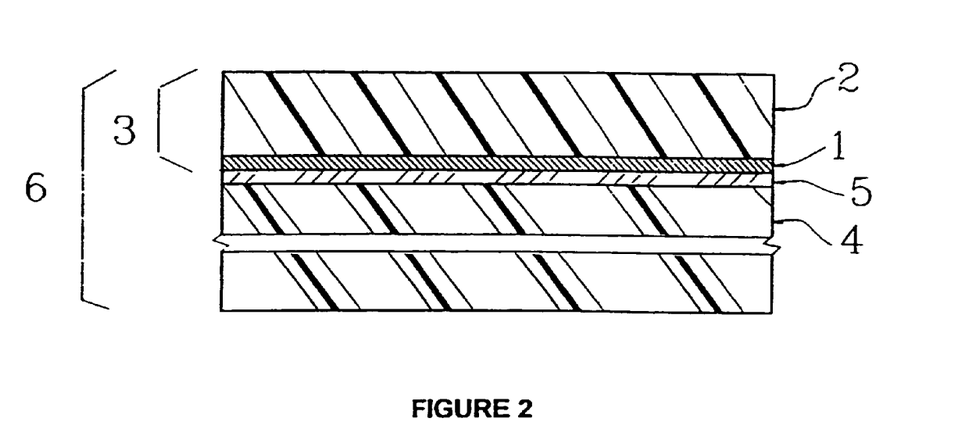
FIGS. 2 and 3 are perspective and elevational views in full section the first typical embodiment of the present invention.
Figure 3:
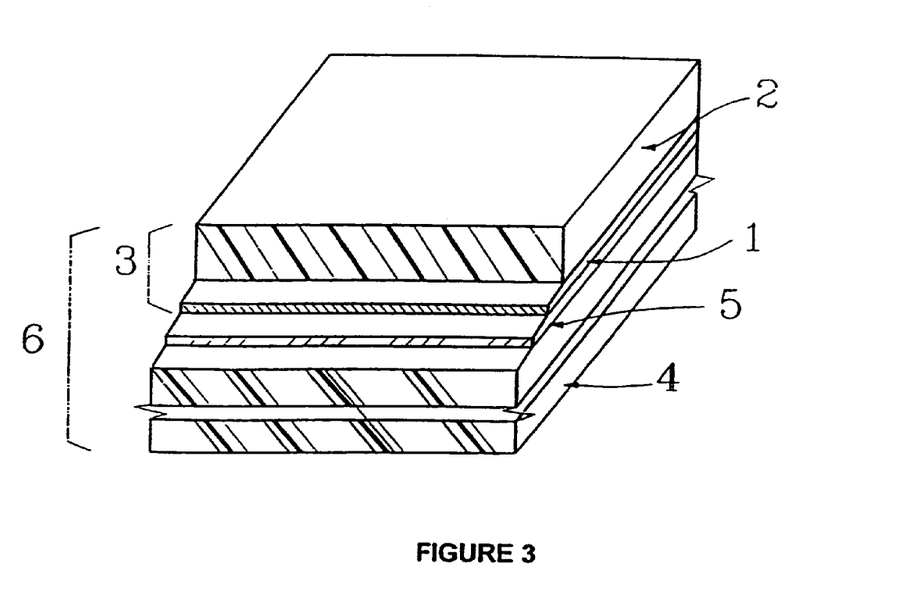

FIGS. 2 and 3 illustrate a metallized heat resistant material 6 which is assembled as a lamination of two film layers. The first layer and upper surface 3 is the primary laminate which is a film composed of vapor deposited aluminum 1 on a polyester film 2. The polyester film 2 is acceptable for a production thickness of 0.00010 inch to 0.00100 inch (0.0254 to 0.254 mm), but more preferably a thickness of 0.00040 inch to 0.00050 inch (0.102 to 0.127 mm) and most preferably of a thickness of 0.00044 inch to 0.00046 inch (0.112 to 0.117 mm). It can, for example, have a thickness of 0.00045 inch (0.114 mm).

The vapor deposition layer of the aluminum 1 is preferably a thickness of 0.00001 inch to 0.00050 inch (0.00254 to 0.127 mm), more preferably a thickness of 0.00008 to 0.00012 inch (0.0020 to 0.0030 mm) and most preferably a thickness from 0.00009 to 0.00011 inch (0.0023 to 0.0028 mm). The maximum optical transmissivity of the aluminum 1 is at most 0.35% (and preferably not more than 0.45%, and more preferably not more than 0.40%, and most preferably not more than 0.35%) with an optical density of at least 2.8, preferably at least 3.0, and most preferably at least 3.2.

The second layer and lower surface 4 is composed of a low-density polyethylene film preferably of a thickness of 0.0015 inch to 0.010 inch (0.038 to 0.25 mm), more preferably from 0.0030 inch (0.076 mm) to 0.0050 inch (0.13 mm) and most preferably a thickness from 0.0044 to 0.0046 inch (0.11 to 0.12 mm). The first layer 3 and second layer 4 are further reinforced by bonding the layers together with a thermoplastic polyester adhesive 5, of at least 1.0 dry pounds to 4.0 dry pounds (0.45 to 1.8 dry kg), more preferably of 2 to 3 dry pounds (0.91 to 1.4 dry kg), and most preferably of 2 to 2.5 dry pounds (0.91 to 1.1 dry kg) per ream coating. For example, it can have 1.8 dry pounds (0.82 dry kg) per ream coating.

Under heat and pressure during the impressment of the two layers by gravure cylinders the embodiment is completed. The material strength of the embodiment is a minimum of 3600 pounds per square inch (24.8 MPa) and has a break strength of 20 pounds per inch width, with an elongation factor of at least 95% at the breaking point. More preferably, the material strength of the embodiment is a minimum of 3650 pounds per square inch (25.2 MPa) and has a break strength of 22 pounds per inch width, with an elongation factor of at least 96% at the breaking point. Most preferably, the material strength of the embodiment is a minimum of 3700 pounds per square inch (25.5 MPa) and has a break strength of 25 pounds per inch width, with an elongation factor of at least 97% at the breaking point.

The lower second film layer 4 (and surface) which is composed of low-density polyethylene film as described previously, provides an inner surface which is compliant with the U.S. Government Food and Drug Administration guidelines when the embodiment is formed into such articles as bags, pouches, or other containers which are used with food or consumables. The inner and outer layers in combination therefore provide a protective, liquid impervious surface which is also a radiant barrier.

The first embodiment 6 of the present invention can be a combination of commercially available film layers. For example, the first film layer 3 can be product # HRSB5 made by NEPTCO Incorporated of Pawtucket, R.I., (and commercially available from Reflectivity L.L.C. of Seattle, Wash. as product code TG) which is made of 0.00048" (0.012 mm) metallized PET (polyester film 0.00043 inch (0.011 mm) thick coated with a 0.00005" (0.001 mm) vapor-deposited layer of Aluminum) acquired from Vacuum Depositing, Inc. The second film layer 4 can be a 0.0045 inch (0.11 mm) thick LDPE (low density polyethylene) layer acquired from Alpha Plastics. These layers 3 and 4 can be bonded together with an adhesive layer such as #009980 (a plastic polymeric adhesive) from NEPTCO, Inc.

Figure 4:
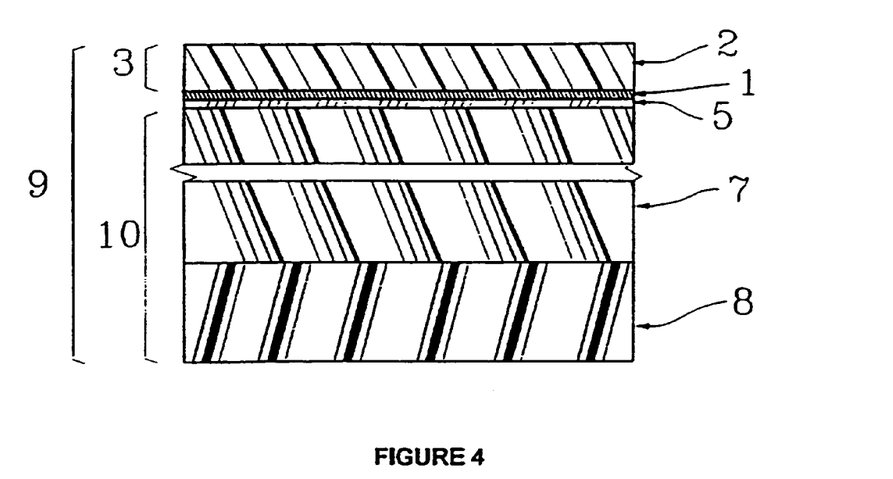
FIGS. 4 and 5 are perspective and elevational views in full section of the second typical embodiment of the present invention.
Figure 5:
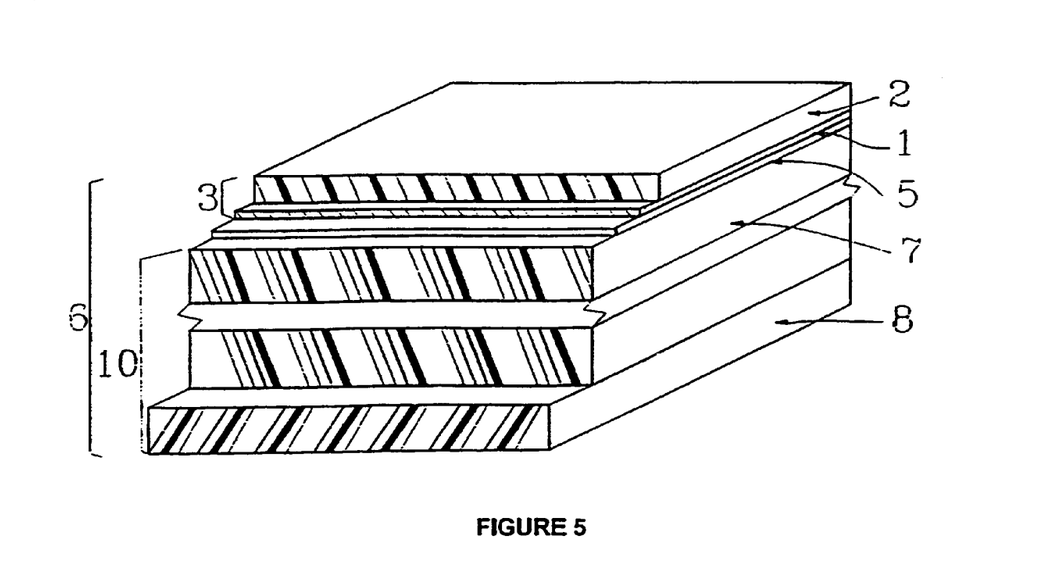

The second preferred embodiment of this invention is illustrated in FIGS. 4 and 5 which illustrates the construction of a metallized heat resistant barrier 9 with a foam liner. This embodiment 9 has the same first (upper) layer 3 as shown in FIGS. 2 and 3 and has been described previously. A second layer 10 (and lower inside surface) is composed of polyethylene foam sheeting 7 which is preferably of a thickness of 0.001 inch (0.025 mm) to 0.05 inch (1.3 mm), more preferably a thickness of 0.02 inch (0.51 mm) to 0.04 inch (1.0 mm) and most preferably a thickness of 0.031 inch (0.79 mm) to 0.033 inch (0.84 mm) and to which has been laminated a polyethylene film layer 8 preferably of a thickness of 0.0001 inch (0.0025 mm) to 0.005 inch (0.13 mm), more preferably of a thickness of 0.0005 inch (0.013 mm) to 0.0020 inch (0.051 mm) and most preferably a thickness of 0.00095 inch (0.024 mm) to 0.00105 inch (0.0267 mm). For example, sheeting 7 can have a thickness of 0.032 inch (0.81 mm) and film 8 can have a thickness of 0.0010 inch (0.025 mm).

The two components 7 and 8 of the layer 10 are bonded together with heat and pressure while being run through a set of gravure cylinders. The layer 10 is then bonded to layer 3 with a polyester adhesive layer 5 again being exposed to heat and pressure when run through a further set of gravure cylinders. This configuration of the second embodiment of FIGS. 4-5 provides both a radiant barrier and a conductive barrier while being in compliance with FDA regulations (such as 21 C.F.R. Sections 177.1520, 184.1324, 184.1505, 174.5, 175.300, 178.2010, 178.3620(A), 178.3297, and 184.1165) for containers for food products or medical supplies. The combination of the second (inner) layer 10 and first (outer) layer 3 of embodiment 9 provide for protective, water impervious surface, radiant barrier and a conductive barrier material.

The second embodiment 9 of the present invention can advantageously be product # HRSB32 made by NEPTCO Incorporated of Pawtucket, R.I. (and commercially available from Reflectivity L.L.C. of Seattle, Wash. as product code ATG), which is a combination of the layer 3, which is made of 0.00048" (0.012 mm) metallized PET (polyester film layer 0.00043 inch (0.011 mm) thick coated with a 0.00005" (0.001 mm) vapor-deposited layer of Aluminum) acquired from Vacuum Depositing, Inc., and a layer 7 of 0.031 inch (0.79 mm) thick polyethylene foam with a 0.001" (0.025 mm) polyethylene film 8 attached thereto, the polyethylene foam/film layer 10 being acquired from Astro-Valcour, Inc. of Glens Falls, N.Y. as AVI item number 71394 (AF030 Lam 100 55"×2000') (1.34 meters×610 meters), these layers bonded together with adhesive #XF8203 (plastic polymeric adhesive) from NEPTCO, Inc.

Figure 6:
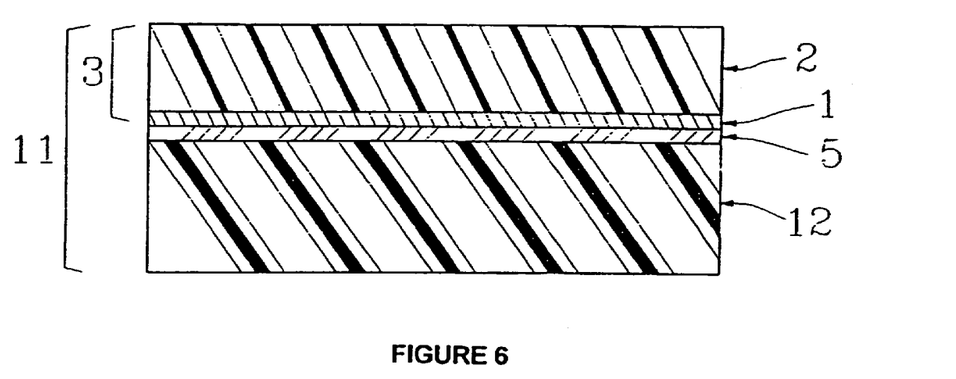
FIGS. 6 and 7 are perspective and elevational views in full section of the third typical embodiment of the present invention.
Figure 7:
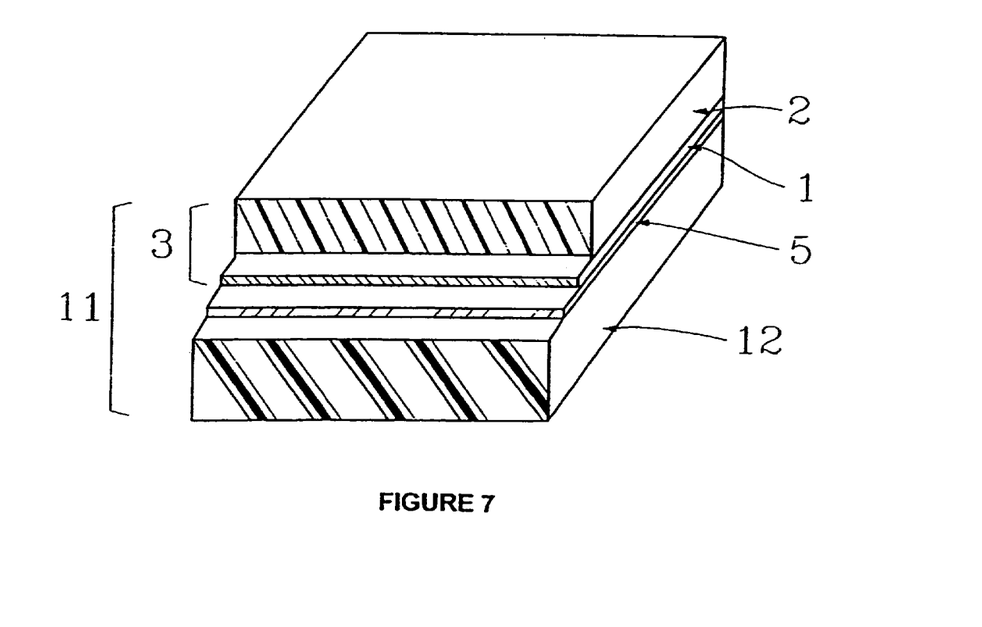

The third preferred embodiment of this invention is illustrated in FIGS. 6 and 7 which depict the construction of a metallized heat resistant barrier 11 which is not heavy or bulky but provides a radiant barrier function without the attendant mass as is common with wallboard and other insulative construction materials. The third embodiment 11 retains the same first (upper) layer 3 as described above and illustrated in FIGS. 2 and 3.

The second (lower) layer 12 is a polyester film preferably of a thickness of 0.0001 inch to 0.005 inch (0.0025 to 0.13 mm), more preferably of a thickness of 0.0008 inch to 0.001 inch (0.020 to 0.025 mm) and most preferably a thickness of 0.00090 inch to 0.00094 inch (0.023 to 0.024 mm), which is bonded to layer 3 while being passed through gravure cylinders providing heat and pressure while a polyester adhesive layer 5 is being applied. Layer 12 is, for example, 0.00092 inch (0.023 mm) thick.

The use of polyester film layer 2 and polyester film layer 12 provide for very high structural and protective integrity for such applications such as a radiant barrier used in homes, storage facilities, and protective coverings not exposed to sun-light. Additionally the use of the Polyester films, 2 and 12, offer a much higher ignition temperature to the embodiment.

The third embodiment 11 of the present invention can advantageously be product # MA 100 made by NEPTCO Incorporated of Pawtucket, R.I. (and commercially available from Reflectivity L.L.C. of Seattle, Wash. as product code IRG), which is made of 0.00048" (0.023 mm) metallized PET (polyester film 0.00043 inch (0.011 mm) thick coated with a 0.00005" (0.001 mm) vapor-deposited layer of Aluminum) acquired from Vacuum Depositing, Inc. and a layer of 0.00092 inch (0.023 mm) thick PET (polyester film) acquired from ICI, DuPont, or Hoechst/Diafoil. These layers can be bonded together with an adhesive layer #016581 (plastic polymeric adhesive) from NEPTCO, Inc.

Figure 8:
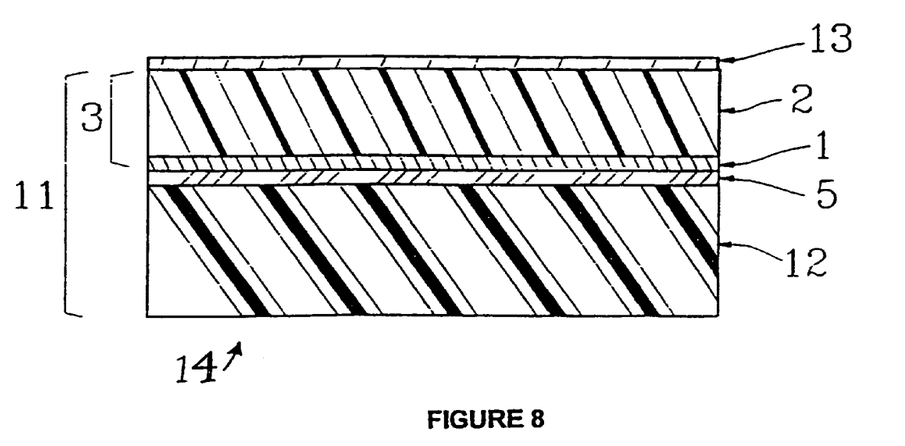
FIGS. 8 and 9 are perspective and elevational views in full section of the fourth typical embodiment of the present invention.
Figure 9:
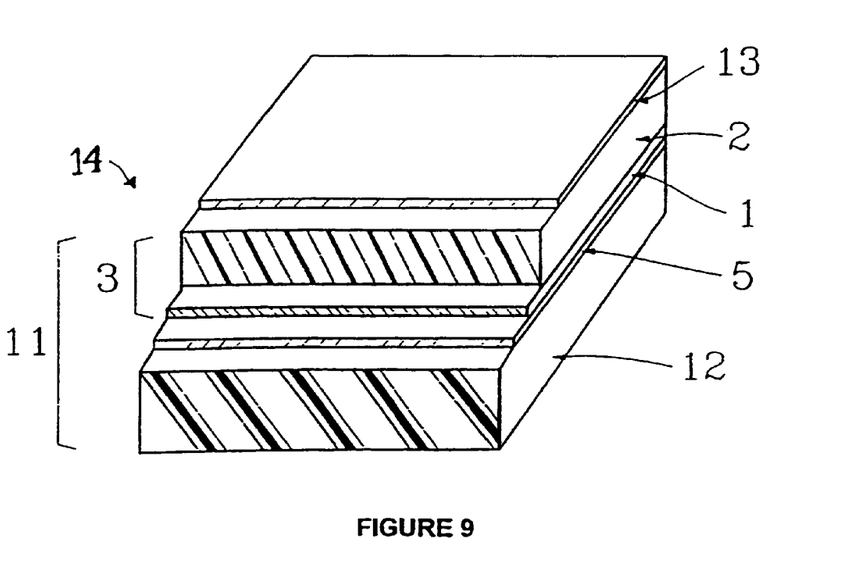

The final preferred embodiment 14 (commercially available from Reflectivity L.L.C. of Seattle, Wash. as product code ARG), is illustrated in FIGS. 8 and 9 where the previously described features of the embodiment 11 of FIGS. 6 and 7 are retained with the addition of a relatively thin acrylic layer 13 being applied preferably to a coating depth preferably of 5 microns to 50 microns, more preferably of 8 to 20 microns and most preferably of a depth of 12 to 14 microns. Layer 13 can have a depth of, for example, 13 microns.

This plastic acrylic layer 13 can be applied by aerosol spray as a part of the finishing process of the embodiment 11. This surface coat of the acrylic layer 13 provides an outer ultra-violet protective skin to the embodiment 11 so that products may be created to be used as radiant barrier tarpaulin or applied to the outside of an existing structure as a radiant barrier. The light mechanical form of the material 11 with the acrylic layer 13 may be affixed easily with standard home construction adhesives normally used in the roofing and finishing trades.

An aerosol spray containing the acrylic for layer 13 is commercially available (e.g., Krylon® brand).

The products are made into rolls of material of various widths which may then may be used directly as heat reflective barrier material in structures, containers, canopies, tarps, tents, which are either freestanding or attached. The product may be further processed by folding, sewing, heat-sealing or through the use of adhesives into bags, containers, covers, or other forms of packaging and garments.

Figure 10:
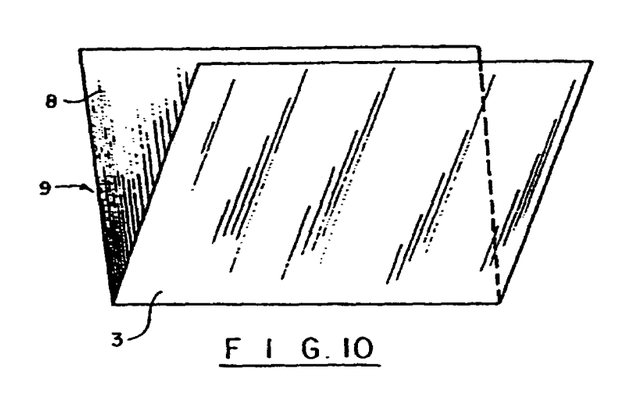
FIG. 10 is a perspective view of a bag of the preferred embodiment of the present invention being made.
Figure 11:
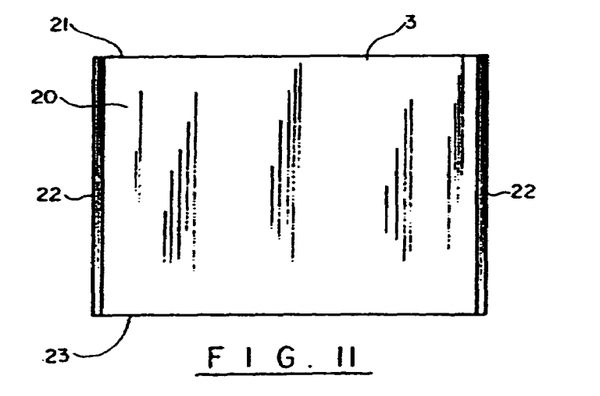
FIG. 11 is a perspective view of a bag of the preferred embodiment of the present invention.
Figure 12:
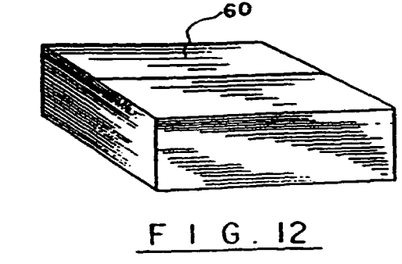
FIG. 12 is a perspective view of a shipping package of the preferred embodiment of the present invention.
Figure 13:
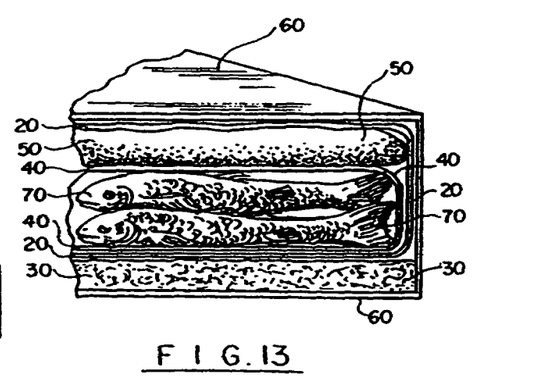
FIG. 13 is a cut-away view of the shipping package of FIG. 12.

FIGS. 10 and 11 show a bag 20 of the present invention. Bag 20 has an open top 21, seams 22 on the sides of bag 20, and a closed bottom 23. Seams 22 can be made, for example, by heat-sealing. Bag 20 could be made of any of the materials of the present invention disclosed herein, but in FIGS. 10-13, it is made of material 9.

As compared to the Wetlock case and gel ice system, the bag 20 of the present invention provides a superior means to solve the problems of extending the short-term storage and transportation of fresh seafood products; and, at the same time, proves an economically viable solution. As compared to Styrofoam packaging, the bag 20 of the present invention Bag closely approximates the heat gain response and costs of Styrofoam while being superior in accessibility and storage.

The present inventors have experimented with two industry-standard packing methods and as well, a new product, the bag 20 of the present invention, in a controlled situation, designed to demonstrate differences between each of their efficiencies in delaying the temperature rise of fisheries products. Each of these packing methods has been designed to keep products at cool temperatures and prevent early spoilage while products are being readied for transportation, and, as well, transported via air from Alaska to outside markets.

The first industry-standard packing system (not shown) is a cardboard fibre case with an internal, lidded Styrofoam container of approximately 0.75" in thickness. A disposable diaper is placed in the bottom of the Styrofoam container and next a thin plastic liner is added. Following this, product and an internal recording thermometer are placed inside the liner which is then folded over the product. Next: two 1.5-pound packs of gel ice are placed on top of the folded liner, the Styrofoam top is set in place and the fibre case is sealed. The external measurements of the fibre case are, 27.5" (69.8 cm) in length×14" (35.6 cm) in width×8.25" (21.0 cm) in height and its weight (including the inner Styrofoam container but without liner or gel ice) is 2.25 lbs (1.02 kg) without the diaper or liner. The internal Styrofoam container weighs 0.85 lb. (0.39 kg). The surface area of the fibre case is 10.10 square feet (0.938 square meters).

The second industry standard is the Wetlock case (a wax impregnated bottom and lid—not shown). First a disposable diaper is placed in the case bottom and a thin plastic liner is added. The product and recording thermometer are placed inside the liner, the liner is folded and two 1.5-pound packs of gel ice are placed on top of the folded liner and the top is set in place. The external measurements of this case are 26.5" (67.3 cm) in length×11.5" (29.2 cm) in width×5" (12.7 cm) in height and it weighs 1.95 lbs. (0.886 kg) without the diaper, liner or gel ice. Its surface area is 6.87 square feet (0.638 square meters).

A third case 60 (see FIGS. 12 and 13) contains the new bag 20 of the present invention and, in our experiments, serves as a comparison of the new methodology with the Styrofoam and the Wetlock packing methods. As before a disposable diaper 30 (FIG. 13) is placed in the bottom of the case 60. Then the bag 20 of the present invention is placed in the case 60. Next a recording thermometer and the product (fish 70) are put in a thin plastic case liner 40, and the case liner 40 is placed in the bag 20 of the present invention. The case liner 40 is folded downward, then two 1.5-pound (0.682 kg) gel ice packs 50 are added on top of case liner 40. The bag 20 of the present invention is then folded down (or otherwise closed, as with double-sided tape, a zip-lock type closure, Velcro® brand hook-and-loop fastening material, plastic clips, or metal clips). The top of case 60 is then set in place. The fibre case 60 is a standard 20 lb. cardboard-fibre crab case. It measures 24.5" (62.2 cm) in length×14.25" (36.2 cm) in width×7" (17.8 cm) in height and has a surface area of 8.61 square feet (0.800 square meters) and it weighs 1.80 lbs (0.818 kg) without the diaper 30, gel ice 50, or the bag 20 of the present invention.

Two experiments are described below. In the first experiment 20 lbs. (9.1 kg) of rockfish fillets were used in each of the three packaging systems. In the second experiment only 19 lbs. (8.64 kg) of rockfish were used, and, in an effort to have near identical starting temperatures, the cases were placed in a blast freezer for four hours prior to the start of the tests. In both experiments, the trials were begun when the three cases were placed side by side on a pallet were they were undisturbed for the duration of the experiment. The first experiment concluded after 46 hours and the second experiment concluded after 60 hours. At the conclusion the recording thermometers were downloaded to a computer application that created graphs of the ambient and internal temperatures of each case. The numerical data were read from the graphs and placed into an MS EXCEL spreadsheet from which new charts and tables were constructed.

Our objective in these studies was to find the comparative likenesses and differences between the three case types and packing systems without seeking absolute conclusions as to the thermodynamics of the three systems.

In CHARTS 1 and 2, graphs of the data in TABLES 1 and 2, represent top to bottom, in degrees Fahrenheit: the ambient temperature, the Wetlock case temperature, the temperature of the bag 20 of the present invention (the "Reflectivity Case Temperature") and, at the bottom, the Styrofoam case temperature.

After an initial period of uncertainty, 4 hours in the first experiment and 6 hours in the second (see CHARTS 1 AND 2), the temperature probes appear to respond consistently and well, and the data from those points forward was used in the analysis of comparative performance. The results of the first four hours of experiment 1 and the first six hours of experiment 2 are ignored in calculating the rates of heat gain in both experiments. In, both experiments (see CHARTS 1 and 2 and TABLES 1 and 2) it is seen that the internal temperatures of the cases containing the bag of the present invention ("Reflectivity Case Temperature" in Table 1 and Table 2 and "Reflectivity Bag" in Chart 1 and Chart 2) lie between those of the Wetlock cases and the Styrofoam cases, the Styrofoam cases being the bottom graph and the Wetlock graphs being the third from the bottom graphs in the charts.

In the first experiment (see TABLE 1) the rate of change of internal temperature of the case 60 containing the bag 20 of the present invention (the "Reflectivity Case Temperature") and the Styrofoam case per hour and per square foot of surface area, for an elapsed time of 42 hours, beginning at the fourth hour, showed only a small difference (0.027-0.026=0.001). In the second experiment (see TABLE 2), where the experiment continued for 60 hours, the difference (0.047-0.032=0.015), beginning at the sixth hour, at an elapsed time of 42 hours and the difference (0.053-0.036=0.017), again beginning at the sixth hour, at an elapsed time of 54 hours was larger. The Wetlock case, again measured per hour per square foot of surface area, also showed a difference between the two experiments at the elapsed times of 42 hours (0.081-0.042=0.039) and 54 hours (0.071-0.042=0.029). Besides differences in the ambient air temperatures, the experimental conditions contrasted by the one pound difference in the product (20 lbs vs. 19 lbs) between the first and second experiment, and, in the second experiment, to the initial exposure of the open cases to the blast freezer at −10 degrees F. for four hours. The data collection in the first experiment continued for 48 hours and in the second experiment extended to 60 hours.

As contrasted with the first experiment, the starting temperatures of the individual cases in the second experiment were similar and lower. There was also a difference between the ambient air temperatures in the first and second experiment. The experiments do not readily allow the separation of the heat gained into the separate classes of conductance, convection and radiation, and in consequence the data is not readily adjustable to reflect the various contributions by the different modes of heat transfer: it is anticipated that future experiments will control the pertinent variables more closely.

The experiments do demonstrate a consistent improvement in performance of the case 60 of the present invention (the "Reflectivity Case") containing the bag 20 of the present invention (the "Reflectivity Bag") over the Wetlock case, and they may demonstrate a close approach to the performance of Styrofoam—it will take several more experiments to determine this. Also, as the data become more reliable analyses by formal methods of linear regression will provide a more exact and reliable comparison of the data.

Styrofoam packaging, especially molded, two-piece styrofoam (the most advantageous styrofoam packaging for optimal insulation) is bulky. There are at least three examples which demonstrate the advantages of insulative packaging made from the material of the present invention as compared to using the more bulky counterpart, styrofoam.

(1) Styrofoam is expensive to transport to the end-user/consumer. For example, it presently costs on the order of $2.25 per two-piece, molded styrofoam box (based on a 50 lb. internal capacity container) to transport one styrofoam two-piece unit from Seattle, Wash. to Anchorage, Ak. In comparison, a bag made from the material of the present invention (based on a 50 lb. internal holding capacity) can be transported, likewise, at a cost on the order of $0.30 per bag.

(2) Styrofoam is expensive to store and warehouse. A single, two-piece molded styrofoam box, which is used to hold 50 lbs. of product, requires approximately 1.8 cubic feet of space. In this same storage space, approximately seventy-five bags 20 of the present invention, each of which can also, eventually, hold 50 lbs. of product, can be stored.

(3) Styrofoam packaging uses up more internal (storage-containment) space, which could otherwise be used to contain more product and/or more coolant (e.g., gel ice, wet ice, etc.). For example, a two-piece molded styrofoam box, which is three-quarters of an inch thick, has an external cubic measurement on the order of 1.8 cubic feet but uses up on the order of 20% of its own internal cubic capacity due to the bulky nature of the styrofoam itself.

Incorporated herein by reference are U.S. patent application Ser. No. 10/245,829, filed 17 Sep. 2002, is incorporated herein by reference, as are U.S. patent application Ser. No. 08/781,285 and its corresponding PCT application no. PCT/US97/00473 (published as WO 97/25196 on 17 Jul. 1997), both filed 10 Jan. 1997.

The following are some additions to the invention which the present inventor has made since those patent applications were filed:

1) Closed Cell Foams

With reference to publication no. WO 97/25196, layer 4 (and, possibly, and/or 2) could be closed cell foams, such as polyurethane foams, polyisocyanurate foams, and closed cell foams that are made out of carbon (all of which can be approximately 20-80 mils thick). The closed cell foams that are made out of carbon again add to the thermal qualities and benefits of the MHRP (metallized heat resistant poly bag)—gas injection of the closed cell foams (discussed below) also applies here—the carbon will help in directing the flow of heat/heat transfer away from the contents.

2) Foams should be flexible for packaging use in perishables.

3) Rigid or stiff polymers may be used for some specialized packaging and or structures, dwelling, vehicle applications (mainly in uses where extreme temperatures come into play; some "thermosetting polymers" once formed never burn or melt again)

The following are examples of some rigid or stiff polymers: Bakelite® (phenolic resin), phenol, and formaldehyde (for non-foodstuffs, industrial use, or automotive use).

4) Closed cell foams are important for the air barrier they supply to retard conduction, but as a secondary use the present inventor wants them also because the air bubbles can be injected with gases that can further add to the thermal protection/longevity of shipping for the product itself (with experimentation of different gases the present inventor believes that one could find a gas that could make the unit self-sufficient not only as just a package but also supplying its own source of cold to feed off of, extending/protecting the perishables; some examples of gases are $CO_2$, C-pentane, nitrogen, hydrogen, etc.

There are many others, and some may be too expensive to utilize at this time. Possible gases to use include noble gases, fluorocarbons, hydrofluorocarbons. There are a lot of dangerous or toxic gases also, that could be used in a specified need for certain customers.

Kaowool™ brand lightweight porous ceramic insulation can be used in high temperature situations, automotive (racing engines), industrial uses where high temperature comes into play, heat shields, etc. It can be used in place of the foams mentioned above.

Additional applications include:

(1) Bags to protect kitchen products. Preliminary tests show no freezer burn (after two years). One can put vegetables in a refrigerator in a bag of the present invention for 6-8 weeks with no browning or slime, they continue to look fresh, as do cheeses and meats.

(2) Cold shipping—perishables, frozen;

(3) Drink containers (e.g., cans, 12 pack box insulation, cartons);

(4) Coolers and cooler bags;

(5) Insulation of refrigerated trucks;

(6) Construction of refrigerators/freezers. A refrigerator/freezer could be made the same outer size as existing refrigerators/freezers but have cubic feet of storage room, smaller compressors, and more energy efficient.

(7) Packaging of blood.

(8) Packaging of pasteurized goods, milk, etc. (the present invention should extend the shelf life of these products).

The invention may be embodied in other specific forms without departing from its spirit or essential characteristics. The described embodiments in all respects are only illustrative and not restrictive and the scope of the invention is, therefore, indicated by the appended claims rather than the foregoing description. All changes that come within the meaning and range of equivalency of the claims are to be embraced within their scope.

The following table lists the parts numbers and parts descriptions as used herein and in the drawings attached hereto.

PARTS LIST

| Part Number | Description |
| --- | --- |
| 1 | vapor deposited aluminum |
| 2 | polyester film |
| 3 | first film layer |
| 4 | second film layer |
| 5 | polyester adhesive layer |
| 6 | metallized heat resistant material |
| 7 | polyethylene foam sheeting |
| 8 | polyethylene film layer |
| 9 | metallized heat resistant barrier material |
| 10 | second layer |
| 11 | metallized heat resistant barrier material |
| 12 | second layer |
| 13 | acrylic layer |
| 14 | metallized heat resistant barrier |
| 20 | bag of the present invention |
| 21 | open top of bag 20 |
| 22 | seam of bag 20 |
| 23 | closed bottom of bag 20 |
| 30 | disposable diaper |
| 40 | thin plastic liner (impervious to water) |
| 50 | gel ice |
| 60 | corrugated cardboard carton |
| 70 | fish |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of shipping frozen and/or refrigerated goods, comprising the steps of:
   providing a bag made of a thermal radiative, insulating barrier film apparatus comprising:
   a) a first layer of polyester film;
   b) the polyester film layer having a vapor deposited coating of aluminum thereon;
   c) a second layer comprising a laminate of a polyethylene film and a closed cell carbon foam;
   d) a layer of thermoplastic polymeric adhesive sandwiched between the aluminum coating and the closed cell carbon foam;
   putting the goods in the bag; and
   shipping the goods.

2. The method of claim 1 wherein the adhesive is a polyester adhesive.

3. The method of claim 1 wherein the first layer has a thickness of between 0.00010 inches and 0.0010 inches (0.0025 and 0.025 mm).

4. The method of claim 1 wherein the first layer has a thickness of between 0.00040 and 0.0005 inches (0.010 and 0.013 mm).

5. The method of claim 1 wherein the first layer has a thickness of between 0.00044 and 0.00046 inches (0.011 and 0.012 mm).

6. The method of claim 1 wherein the vapor deposited coating of aluminum has a thickness of between 0.00001 and 0.00050 inches (0.00025 and 0.0013 mm).

7. The method of claim 1 wherein the vapor deposited coating of aluminum has a thickness of between 0.00008 and 0.00012 inches (0.0020 and 0.0030 mm).

8. The method of claim 1 wherein the vapor deposited coating of aluminum has a thickness of between 0.00009 and 0.00011 inches (0.0023 and 0.0028 mm).

9. The method of claim 1 wherein the vapor deposited coating of aluminum has a maximum transmissivity of about 35%.

10. The method of claim 1 wherein the vapor deposited coating of aluminum has an optical density of between about 2.8 and 3.2.

11. The method of claim 1, further comprising the step of adding in the bag a material which is colder than the goods.

12. A method of shipping frozen and/or refrigerated goods, comprising the steps of:
   providing a bag made of a thermal radiative, insulating barrier film apparatus comprising:
   a) a first layer of polyester film;
   b) the polyester film layer having a vapor deposited coating of aluminum thereon;
   c) a second layer comprising a laminate of a polyester film and a closed cell carbon foam; and
   d) a layer of thermoplastic polymeric adhesive sandwiched between the aluminum coating and the closed cell carbon foam;
   putting the goods in the bag; and
   shipping the goods.

* * * * *